United States Patent [19]

Richard

[11] 4,175,579
[45] Nov. 27, 1979

[54] DEVICE FOR AUTOMATIC, SELECTIVE WATERING OF PLANTS

[75] Inventor: Louis Richard, Cholet, France

[73] Assignee: Jean Ollivier, Mortagne-sur-Sevre, France

[21] Appl. No.: 793,423

[22] Filed: May 3, 1977

[30] Foreign Application Priority Data

May 4, 1976 [FR] France .................. 76 13228

[51] Int. Cl.$^2$ ........................................ G05D 11/00
[52] U.S. Cl. ...................... 137/119; 137/624.2; 251/45; 137/624.14
[58] Field of Search ............. 137/119, 624.2, 624.18, 137/624.14; 251/46, 45

[56] References Cited

U.S. PATENT DOCUMENTS

| | | | |
|---|---|---|---|
| 2,744,541 | 5/1956 | Fleischhauer | 137/627 |
| 2,781,050 | 2/1957 | Edwards | 137/119 |
| 3,246,668 | 4/1966 | Hirsch | 137/624.18 |
| 3,372,708 | 3/1968 | Hotchkin | 137/624.2 |
| 3,500,863 | 3/1970 | Wilson | 137/624.2 |
| 3,529,618 | 9/1970 | Rinkewich | 137/119 |
| 3,779,269 | 12/1973 | Gould | 137/119 |
| 3,805,822 | 4/1974 | Joannon | 251/46 |
| 3,806,081 | 4/1974 | Otto | 251/45 |
| 3,938,426 | 2/1976 | Hunter | 92/140 |
| 3,955,791 | 5/1976 | Meckstroth | 251/45 |
| 4,022,239 | 5/1977 | Schwindt et al. | 137/119 |

FOREIGN PATENT DOCUMENTS

1782094  1/1972  Fed. Rep. of Germany.

*Primary Examiner*—William R. Cline
*Assistant Examiner*—H. Jay Spiegel
*Attorney, Agent, or Firm*—Cushman, Darby & Cushman

[57] ABSTRACT

A device for automatically selectively watering plants in a predetermined order for predetermined times comprises a casing which is connectable to a source of water under pressure and which houses a turbine wheel arranged to be driven by the water and to drive a set of gears which form a speed reducer the output shaft of which extends out of the casing and carries a plurality of cams spaced apart along the shaft and each arranged to operate a valve of the pilot-operated type, the valves being identical, juxtaposed in a straight line, and connectable to pipes provided with watering nozzles.

5 Claims, 4 Drawing Figures

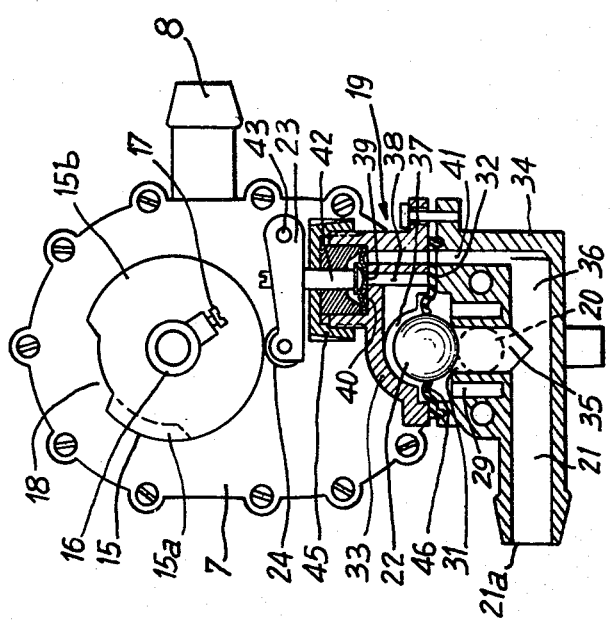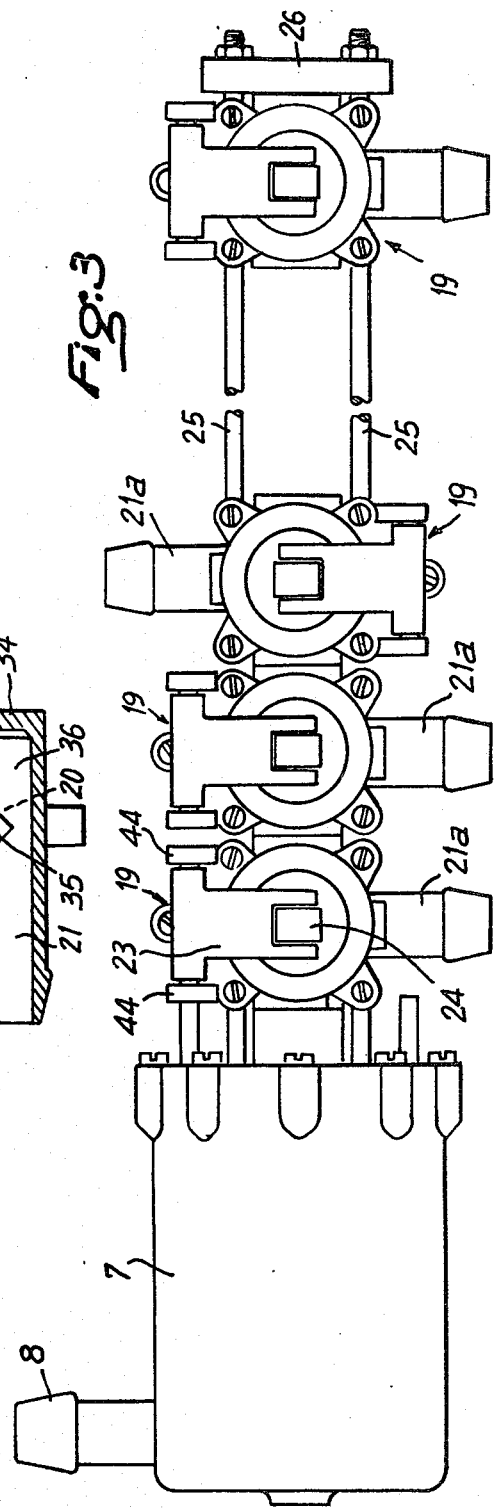

DEVICE FOR AUTOMATIC, SELECTIVE WATERING OF PLANTS

BACKGROUND OF THE INVENTION

1. Field of the Invention

This invention relates to a device for the automatic, selective watering of plants in a garden or any cultivated zone in a predetermined order and for predetermined times.

2. Description of the Prior Art

Automatically operable means are known for watering plants, but these means comprise the association with a system of water pipes provided with electric valves of a circuit of electric wires which connect the electric valves to a source of electrical energy and which control operation of the valves in accordance with signals transmitted by an electric clock. An installation of this kind, composed of water pipes and electric cables, is relatively expensive; in addition, it is dangerous for a system of electric wires to be closely associated with a water distribution system.

The main object of the invention is to provide an automatic watering device utilising no electric energy and consequently composed solely of non-electrical apparatus and pipes connected to a source supplying water under pressure.

SUMMARY

The invention is utilisable with a water distribution system for watering purposes, composed of a multiplicity of different pipes which are buried in the ground and each of which leads individually to a corresponding watering nozzle. These nozzles are selectively and successively fed with water for a predetermined time.

According to the invention there is provided a device for the automatic, selective watering of plants from a supply of water under pressure and with the aid of a number of individual water distribution pipes, comprising a driving element driving a speed reducer which has an output shaft carrying a plurality of spaced cams arranged respectively to operate valves of the pilot-operated type, the valves being identical and juxtaposed in a straight line one against the other, wherein the driving element is a water turbine the wheel of which is arranged to be driven by water delivered under pressure to the device.

In the preferred embodiment of the invention the driving element is housed in a closed casing which is connectable to a supply of water under pressure and which has an opening therefrom, the casing containing the wheel of the turbine and a set of gears forming the speed reducer, the output shaft of the speed reducer extending outside the casing.

Each valve has a water inlet aperture, a water outlet aperture connectable to a pipe supplying a watering nozzle, and a movable element which isolates or brings the two apertures into communication, the position of the movable element being controlled by the corresponding cam.

In one embodiment of the invention the valves are juxtaposed in a straight line one against the other, their water inlet apertures being in communication in series, and the first valve being connected directly by its water inlet aperture to an aperture provided in the casing.

Each valve is preferably of the pilot-operated type having an auxiliary cock whose position determines the position of the movable element of the valve; the control lever of each valve associated with a cam acts on the auxiliary cock.

BRIEF DESCRIPTION OF THE DRAWINGS

FIG. 3 is a plan view of part of the device shown in FIG. 2, and FIG. 4 is a view partly in section on the line IV—IV in FIG. 2.

DESCRIPTION OF THE PREFERRED EMBODIMENT

Figure 1:
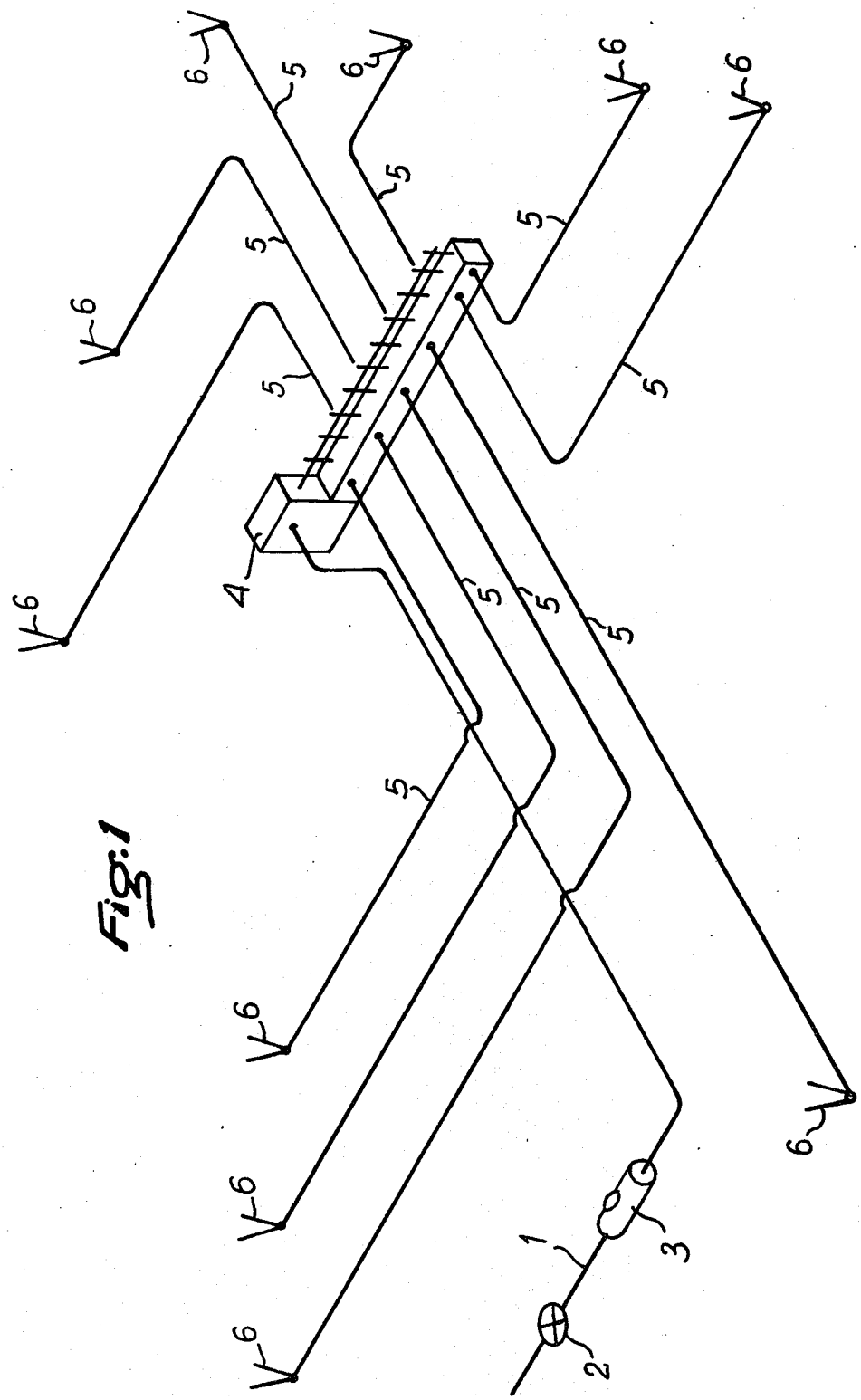
FIG. 1 is a diagrammatical view in perspective of a watering system operation of which is controlled by a device according to the invention.

Referring to the drawings, FIG. 1 shows an automatic system for watering plants comprising a main water supply pipe 1 to which are connected a main stop cock 2 and a meter 3. The main supply pipe 1 leads to a device 4 according to the invention, from which extend various pipes 5. At the end of each pipe 5 there is connected at least one watering nozzle 6. The nozzles 6 are of any suitable kind; each nozzle is arranged to water a part of a planted area and the main supply pipe 1 and the pipes 5 are buried beneath the soil.

It is not possible to contemplate the simultaneous operation of all of the nozzles 6 because of the limited flow of water through the main supply pipe 1, the pressure necessary for the correct operation of the nozzles 6, and also because the various parts of the planted area do not require the same amounts of water. The purpose of the device 4 is therefore to supply water to the pipes 5 in a predetermined order during predetermined periods of time.

Figure 2:
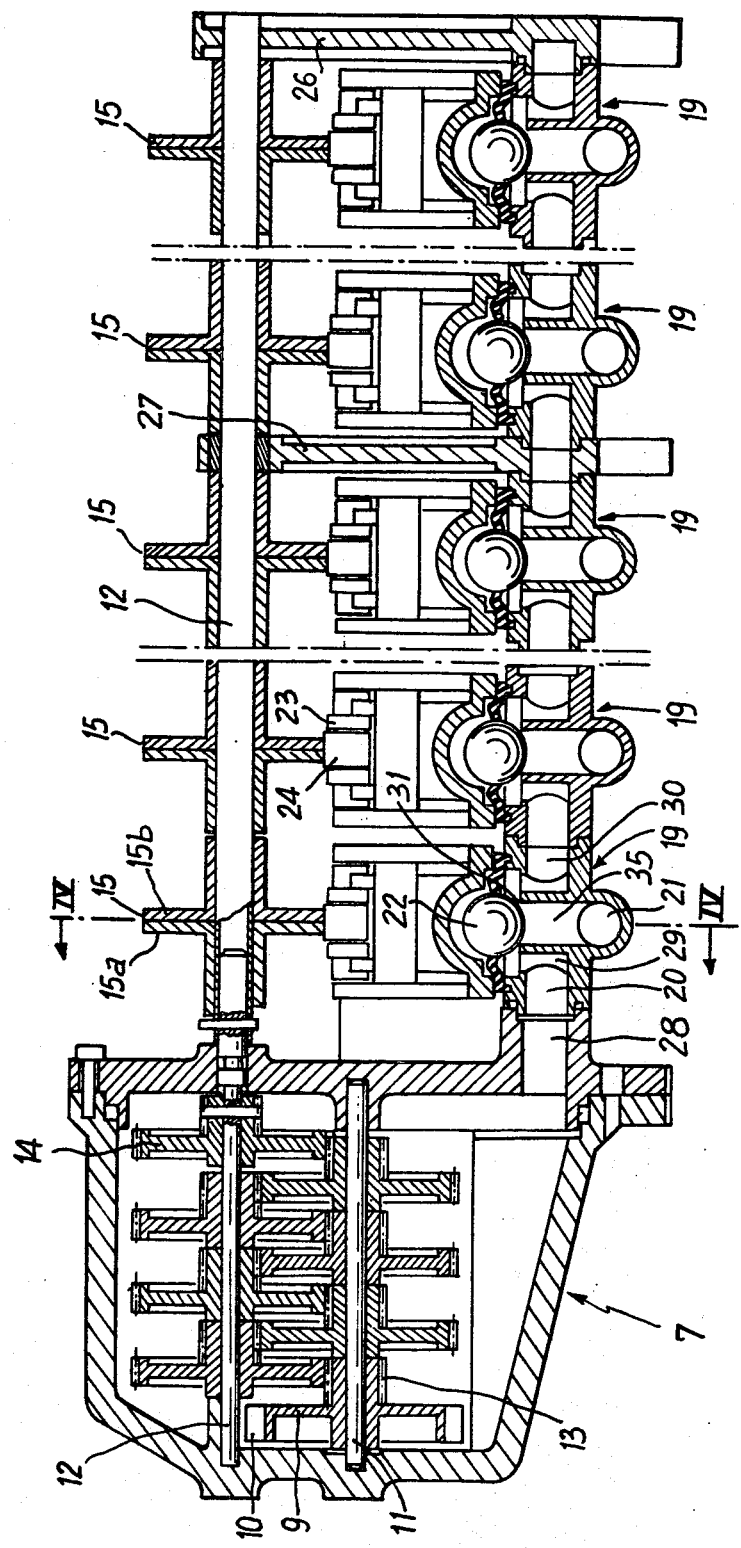
FIG. 2 is a sectional elevation of an automatic watering device according to the invention.

The device 4 comprises a closed casing 7, FIGS. 2 and 3, which is connected by a connector 8, FIGS. 3 and 4, to the main supply pipe 1. Inside the casing 7 the connector 8 is extended by a nozzle (not shown in the drawings) which is disposed facing a turbine wheel 9, FIG. 2, provided on its periphery with blades 10. Two parallel shafts 11,12 mounted in the casing 7 support a reduction gear train composed of six pairs of pinions and gear wheels. A first pinion 13 is rotatable with the turbine 9 which is mounted on the shaft 11, and the last gear 14 is keyed to the shaft 12. With a water supply pressure of 2.5 kg/cm$^2$ the turbine 9 rotates at a speed of about 500 revolutions per minute, and the speed reduction is such that the shaft 12 makes about three revolutions per hour.

The shaft 12 passes out of the casing 7 and an extension of the shaft 12 carries cams 15 which are spaced apart longitudinally of the shaft, and each of which is composed of two plates 15a, 15b, each having a hub 16 provided with a lock screw 17. The plates 15a, 15b are clamped against one another and each has on its periphery a depression 18. By regulating the relative the angular position of the plates 15a, 15b with the aid of the screws 17, it is possible to adjust the angular length of the notch 18 during which the cam 15 is inoperative.

With each cam 15 is associated a valve 19 which has a water inlet aperture 20 and a water outlet aperture 21, FIG. 4. Each aperture 21 is extended by a connector 21a directed on one side or the other transversely in relation to the shaft 12 and serving for the connection there-of to one of the pipes 5.

Each valve 19 contains a movable element 22 which permits or prevents the passage of water between the aperture 20 and the aperture 21, and is provided with an articulated lever 23 one end of which is provided with a roller 24 which cooperates with the corresponding cam 15. It would be conceivable for each cam 15 to control the movable element 22 directly with the aid of the lever 23.

Nevertheless, this direct operation makes it necessary for each cam 15 to supply a sufficient force, and it is possible that the turbine 9 will not be able to develop sufficient torque to drive all the cams 15.

It is preferable for all the valves 19 to be of the pilot-operated type. It is also advantageous for the valves 19 to be juxtaposed in a straight line one against the other, the levers 23 each corresponding to one of the cams 15. Tapped holes are provided in the side face of the casing 7, on the side where the cams 15 are disposed, and rods 25 (shown only in FIG. 3) are screwed into the holes and are connected at their opposite ends by an end plate 26. The end plate 26 serves to support one end of the shaft 12 and to clamp the valves 19 firmly against one another. When the number of valves 19 is large, at least one intermediate pipe 27 interposed between the cams 15 and the valves 19 guides and supports the rods 25.

The inlet aperture 20 of the valve 19 nearest the casing 7 is clamped against the casing and is directly connected to an aperture 28 provided in the wall of the casing. In addition, for each valve 19 the inlet aperture 20 leads into an upstream annular chamber 29 in communication with a second aperture 30. The latter is symmetrical to the aperture 20 and is in line with it. In this way, when all the vlaves are mounted against the casing 7 as explained above, and as shown in FIGS. 2 and 3, the water from the main supply pipe 1 entering the casing 7 turns the turbine wheel 9, passes through the aperture 28, enters all the valves 19 by way of the apertures 20,30, and fills all of the annular chambers 29.

In each valve 19 the inside wall of the annular upstream chamber 29 is cylindrical; it ends at its apex in a seat 31 against which can be applied the movable element 22 which is fastened to a flexible membrane 32.

At its periphery the flexible membrane 32 is clamped between a top body half 33 and a bottom body half 34, the top and bottom halves being connected by screws to constitute the valve body 19.

In the bottom body half 34 the inside wall of the annular upstream chamber 29 forms below the seat 31 an inner passage 35, which leads to an inner space 36, FIG. 4, at one end of which are situated the aperture 21 and the connector 21a.

In the top half 33 the flexible membrane 32 and the movable element 22 are free to move, in the direction away from the seat 31, inside a downstream chamber 37, FIG. 4, whose top wall has a passage 38 of small diameter which can be closed by a clack valve 39. The clack valve 39 is movable in a chamber 40 into which leads an inner passage 41 passing through the top body half 33 and the bottom body half 34, and thence into the inner space 36. The passage 38 and the valve 39 constitute an auxiliary cock which enables the downstream chamber 37 and the space 36 to be isolated or brought into communication.

On the clack valve 39 rests a rod 42 which passes through the wall of the valve 19 and which passes out of the latter under the lever 23. The lever 23 is pivoted on a pin 43 which is held in two lugs 44, FIG. 3, spaced apart and forming part of the top body half 33. A cap 45, FIG. 4, is screwed onto the top body half 33, and the rod 42 passes through the cap 45 to give access to the clack valve 39.

A small hole 46, FIG. 4, is formed in the flexible diaphragm 32 associated with each movable element 22.

The device operates in the following manner.

When the device is at rest there is always at least one valve 19 which is in the open position under the action of the corresponding cam 15. When the main stop cock 2 is opened, water enters the casing 7 through the connector 8, turns the turbine wheel 9, the shaft 12, and the cams 15, passes through the opening 28, flows into the annular chambers 29 of all the valves 19, passes through the connector 21a of the valve or valves which is or are open, and then passes through a pipe line 5 and out through a watering nozzle 6.

In the closed valves, such as that shown in FIG. 4, the cam 15 bears against the lever 23, with the consequence that the rod 42 applies the clack valve 39 against the passage 38; the latter is therefore closed. On arriving in the annular chamber 29 the water tends to raise the movable element 22, but it also passes through the hole 46 in the flexible membrane 32, and it fills the chamber 37 from which it cannot pass out through the passage 38, which is closed.

Pressure equalises on both sides of the flexible membrane 32, and the movable element 22 tends to rest on the seat 31. In this condition the surface of the movable element 22 which is exposed to the pressure in the chamber 37 is smaller than that which is exposed to the same pressure in the annular chamber 29. Consequently the water cannot pass through the valve 19.

When the cam 15 has turned sufficiently for the depression 18 to reach the roller 24 of the lever 23, the pressure of the water which is applied to the valve 39 raises the latter which is no longer held by the rod 42.

The water from the chamber 37 passes through the passage 38 and flows through the passage 41. The pressure falls in the chamber 37 and cannot be restored because the hole 46 has a smaller section than the passage 38. The water then raises the movable element 22 above the seat 31 and it passes through the inner passage 35 to reach the connector 21a, a pipe 5, and a watering nozzle 6.

When the cam 15 again bears against the lever 23, the rod 42, and the clack valve 39, the pressure again rises in the chamber 37 and the movable element 22 is applied against its seat 31 as previously. The passage of the watering water is interrupted.

It will be observed that a fairly slight force is sufficient to close the valve 19 and to hold it closed. This force is reduced to the value of the water pressure multiplied by the area of the passage 38, which can be very small.

The device is capable of automatically directing water for watering purposes to a number of nozzles 6 in the desired order and for predetermined periods of time without using any electric power, working from a single connection to a supply of water under pressure.

It will also be noted that the cams 15 are easily adjustable in respect of their operative time. They are all identical, which is also true of the valves 19. It is therefore easy to manufacture the device in dependence on the number of watering nozzles 6 to be supplied. It is also easy to modify an existing device to adapt it to a larger number of pipes 5.

A particular type of pilot-operated valve has been described above, but it will be understood that it would be possible to use another type of valve having a pilot-operated movable element without thereby departing from the scope of the invention as defined in the appended claims.

I claim:

1. Apparatus for the automatic and selective watering of plants or the like with a supply of water under pressure and with the aid of a number of individual water distribution pipes, said apparatus comprising a reduction gear housed in a gear case, a driving element for driving said reduction gear, means for supplying water under pressure to drive said driving element, said gear case having a lateral face with an outlet opening for the water and a rotatable shaft which carries a plurality of spaced cams and which is driven by said reduction gear, a plurality of valve means of the type operated by a pilot valve, each said valve means having, on one side, a water inlet port having a selected shape and, on the opposite side thereof, a water outlet port having a shape that is complementary to said selected shape so that said inlet port of a said valve means can interfit to couple with the outlet port of an adjacent valve means, each said valve means having an internal chamber in flow communication with said inlet and outlet ports of each said valve means, another outlet port for the distribution of water when said valve means are open, said plurality of valve means being coupled in parallel flow series with the first valve means adjacent said lateral face of said gear case and having its water inlet port coupled to said outlet opening disposed in said lateral face, said cams cooperating each respectively with the valve means to control the opening and closing thereof during rotation of said output shaft.

2. Apparatus for the automatic and selective watering of plants or the like with a supply of water under pressure and with the aid of a number of individual water distribution pipes, said apparatus comprising a reduction gear housed in a gear case, a driving element for driving said reduction gear, means for supplying water under pressure to drive said driving element, said gear case having a lateral face with an outlet opening for the water and a rotatable shaft which carries a plurality of spaced cams and which is driven by said reduction gear, a plurality of valve means of the type operated by a pilot valve, each said valve means having on one side a water inlet port and on an opposite side a water outlet port connected to said water inlet port through an internal chamber, said inlet port of each valve means being shaped to couple with a said outlet port of an adjacent valve means, said valve means being coupled in parallel series with the first valve means adjacent said lateral face of said gear case and having its water inlet port coupled to said outlet opening disposed in said lateral face, said cams cooperating each respectively with the valve means to control the opening and closing thereof during rotation of said output shaft, each said valve means including a pilot valve which is actuated by the water, each valve means further including an internal membrane having a small water passage hole therein, each pilot valve including a clack valve, a passage leading from one side of said membrane to each said water outlet port, said passage means being closable by said clack valve and being larger in size than said hole in said membrane, each said clack valve comprising a lever pivotably mounted to be movable against said clack valve with said lever being actuatable by a said respective cam.

3. The apparatus as claimed in claim 2 wherein said internal chamber of each valve means has an interior wall extending vertically and having at its upper end a valve seat, a movable element for engaging said valve seat for opening and closing said internal chamber to said water outlet port, said movable member being connected to said membrane so as to be movable therewith.

4. The apparatus as claimed in claim 3 wherein said membrane and said movable member connected thereto divide said internal chamber into an upstream and a downstream chamber and said passage on said one side of said membrane is located in said downstream chamber, said passage being connected to said outlet port of each said valve means.

5. Apparatus for the automatic and selective watering of plants or the like with a supply of water under pressure and with the aid of a number of number of individual water distribution pipes, said apparatus comprising a reduction gear housed in a gear case, a driving element for driving said reduction gear, means for supplying water under pressure to drive said driving element, said gear case having a lateral face with an outlet opening for the water and a rotatable shaft which carries a plurality of spaced cams and which is driven by said reduction gear, a plurality of valve means of the type operated by a pilot valve, each said valve means having on one side a water inlet port and on an opposite side a water outlet port connected to said water inlet port through an internal chamber, said inlet port of each valve means being shaped to couple with a said outlet port of an adjacent valve means, said valve means being coupled in parallel series with the first valve means adjacent said lateral face of said gear case and having its water inlet port coupled to said outlet opening disposed in said lateral face, said cams cooperating each respectively with the valve means to control the opening and closing thereof during rotation of said output shaft, said lateral face having means for supporting a support shaft extending from said lateral face beyond said plurality of valve means and an end plate being provided and which is supported on the end of said support shaft to hold said valve means in compact relation against one another.

* * * * *